United States Patent Office 3,299,521
Patented Jan. 24, 1967

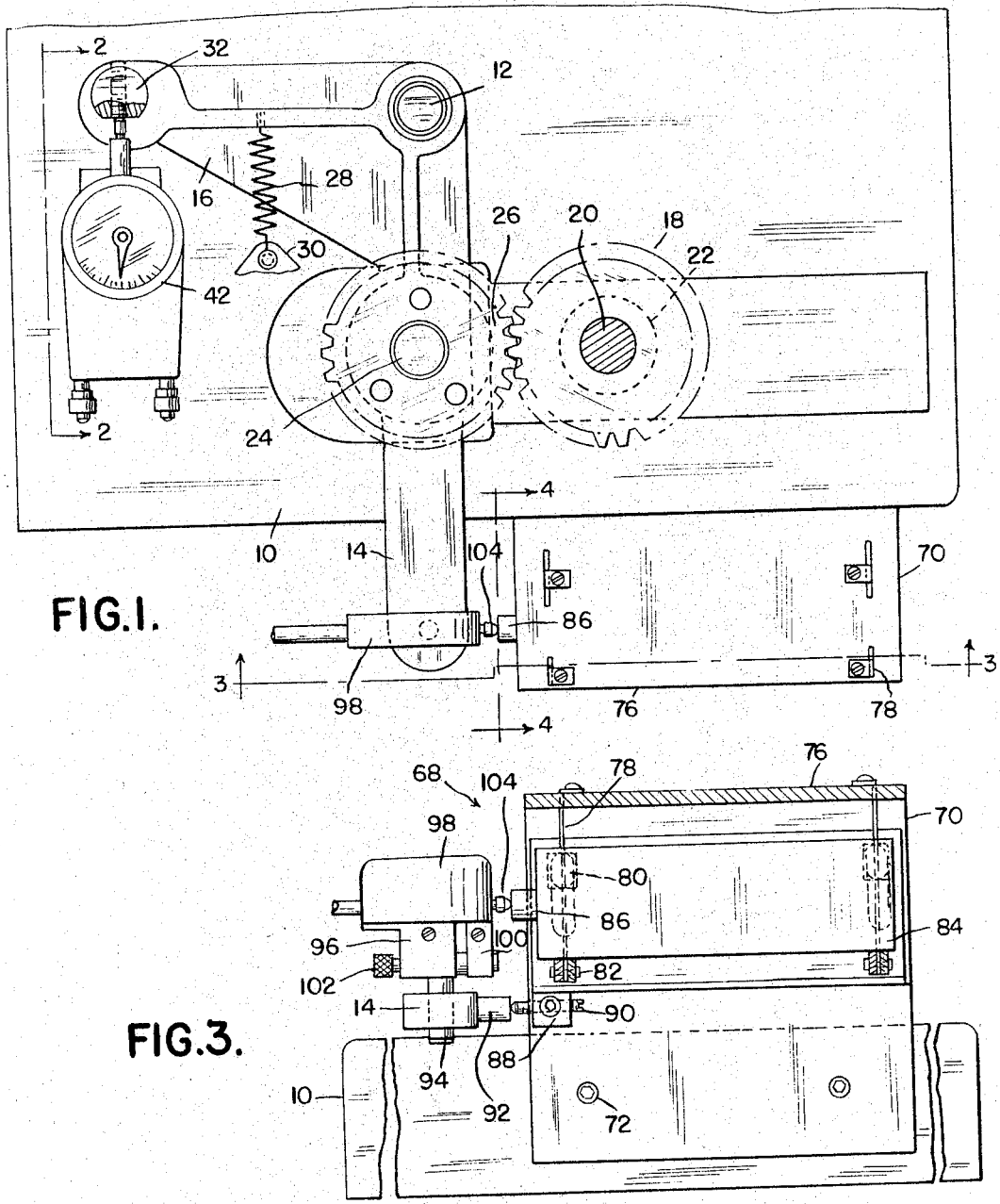

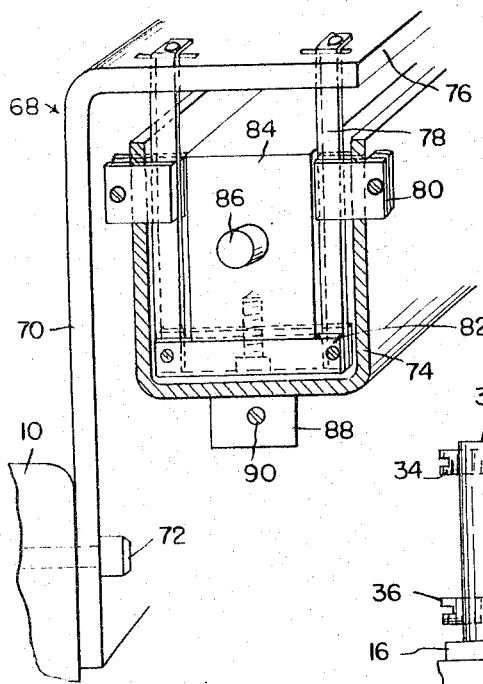
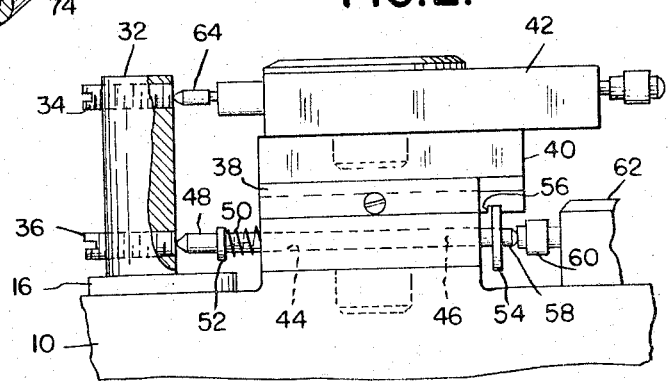
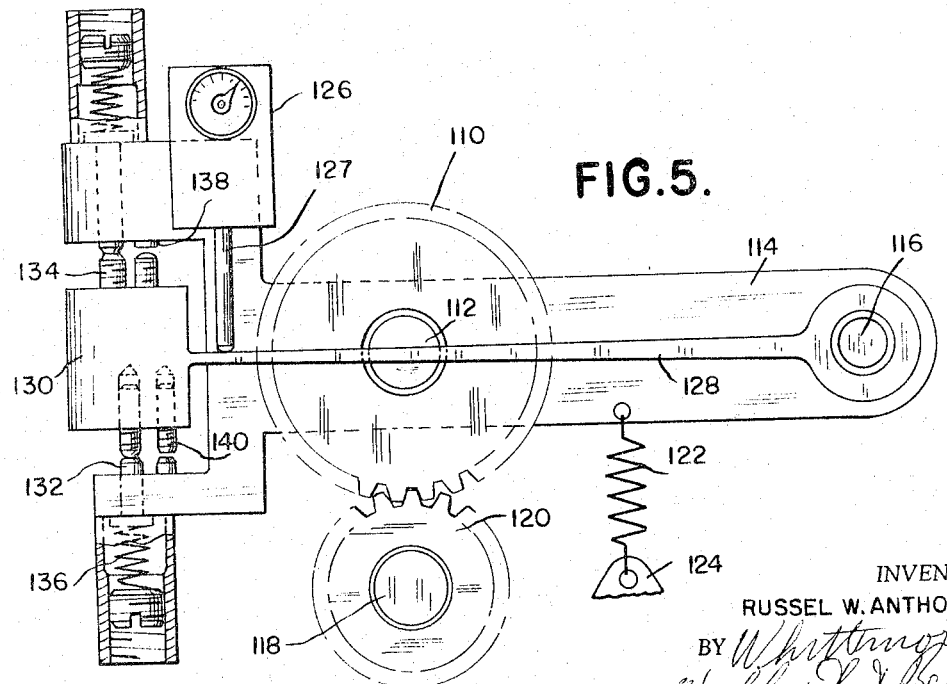

3,299,521
GEAR CHECKER
Russel W. Anthony, Detroit, Mich., assignor to National Broach & Machine Company, Detroit, Mich., a corporation of Michigan
Filed May 5, 1964, Ser. No. 364,961
3 Claims. (Cl. 33—179.5)

The present application is a continuation-in-part of copending application Serial No. 130,337, filed July 6, 1961, now abandoned.

The present invention relates to a gear checker, and more particularly, to a gear checker for simultaneously checking gear characteristics such as eccentricity, and also errors such as tooth-to-tooth spacing, nicks on the gear teeth, and the like.

In the past, apparatus for checking eccentricity of work gears has required a separate manual setting for each different size of gear checked. The present invention provides means automatically conditioning the apparatus for different sizes of work gears. The gear checking operation comprises merely locating a work gear on a post or the like on the apparatus and rotating the work gear in mesh with a master gear, one of which is mounted for movement relative to the other in accordance with eccentricity, tooth-to-tooth spacing, nicks, and the like.

It is accordingly an object of the present invention to provide improved apparatus for checking the eccentricity of different size gears without requiring adjustment of the apparatus.

Another object of the present invention is to provide improved means for checking such errors as tooth-to-tooth errors, nicks, and the like.

It is a further object of the present invention to provide means for simultaneously checking eccentricity, tooth-to-tooth spacing, nicks and the like.

More specifically, it is a feature of the present invention to provide apparatus for checking the eccentricity of different size gears including an indicator, means automatically responsive to engagement of a work gear with a master gear to position the indicator in accordance with the size of the gear to be checked, and means movable in accordance with eccentricity of the gear relative to the indicator in said position, preferably including means for moving the indicator to an initial position after checking of each gear.

Another object of the present invention is to provide means for checking errors such for example as tooth-to-tooth spacing, nicks, and the like, including means for moving a carrier an amount and at a speed proportional to eccentricity, tooth-to-tooth spacing errors, nicks, and the like, a high inertia member movably connected to said carrier and movable therewith in response to relatively slow movement thereof as occasioned by eccentricity errors, and movable relative thereto in response to relatively rapid movement of the carrier member indicating errors of the type occasioned by tooth-to-tooth spacing errors, nicks, and the like, and indicating means for measuring the total movement of said carrier and the relative movement between said carrier and said inertia member.

Other objects and features of the invention will become apparent as the description proceeds, especially when taken in conjunction with the accompanying drawings, illustrating preferred embodiments of the invention, wherein:

FIGURE 1 is a plan view of gear checking apparatus constructed in accordance with the present invention.

FIGURE 2 is a fragmentary side elevation looking in the direction of the arrows 2—2, FIGURE 1.

FIGURE 3 is a fragmentary side elevation looking in the direction of the arrows 3—3, FIGURE 1, with parts in section.

FIGURE 4 is a fragmentary elevational view looking in the direction of the arrows 4—4, FIGURE 1.

FIGURE 5 is a diagrammatic view illustrating a modification of gear checking apparatus.

Referring now to FIGURES 1–4 the apparatus comprises a base 10 having a post 12 extending upwardly therefrom to which is pivoted a bell crank lever having arms 14 and 16. Means are provided for receiving and rotating a work gear 18 and this means comprises an arbor 20 driven in rotation by suitable means such as a motor 22. Mounted on a post 24 on the arm 14 is a master gear 26 conjugate to the work gear 18. A tension spring 28 connected between a fixed support 30 and the lever arm 16 is effective to urge the lever in a counterclockwise direction about its mounting post 12 so as to maintain the teeth of the master gear 26 in full mesh with the teeth of the work gear 18.

The portion of the gear checking apparatus effective to measure eccentricity of the work gear will now be described with particular reference to FIGURE 2. Lever arm 16 is provided adjacent its end with an upstanding post 32 through which are extended adjustable abutment screws 34 and 36. The upper surface of the base 10 is provided with a pad 38 having ways in which is slidably received an indicator support block 40 carrying an indicator 42. The pad 38 has an opening 44 therethrough which receives a pin 46 one end 48 of which engages an end of the adjustable abutment screw 36. A compression spring 50 is provided between the pad 38 and a collar 52 on the pin 46 effective to maintain the pin in engagement with abutment screw 36.

At its opposite end the pin 46 is provided with a flange 54 extending into a notch 56 provided in the slidable indicator support block 40. In addition, the end 58 of the pin 46 engages the plunger 60 of a second indicator, a portion of which is indicated at 62.

The indicator 42 includes a movable extending plunger 64 which engages the adjacent end of the adjustable abutment screw 34.

With the mechanism as just described it will be noted that when a work gear is placed on the mounting post 20 the master gear 26 is moved into clearance by clockwise rotation of the bell crank lever about its pivot post 12. This results in movement of the post 32 in a clockwise direction as seen in FIGURE 1, which is away from the pin 46 and the indicator 42, as seen in FIGURE 2. At this time the spring 50 is effective to cause the pin 46 to follow the post 32 so far as permitted, and movement of the pin through the engagement between the flange 54 and notch 56 results in sliding movement of the indicator support block 40 to the left, as seen in FIGURE 2. When the master gear 26 is allowed to mesh with the work gear as a result of counterclockwise movement of the bell crank lever about its pivot post 12, under the influence of the spring 28, the post 32 will move to the right as seen in FIGURE 2 and this movement, transmitted to the pin 46, will shift the indicator support block 40 to the right to some intermediate position depending upon the eccentricity if any, in the work gear 18. Rotation is now imparted to the arbor 20 causing the work gear 18 to rotate about its axis. If it is assumed that the work gear has eccentricity, the master gear 26 will be moved in a slight arc about the axis of its pivot post 12. When the low point of the work gear 18 is in mesh with the master gear 26 the post 32 will have reached its limiting position to the right as seen in FIGURE 2. Continued rotation of the work gear will then cause the post to move first to the left and then back to the right, as seen in FIGURE 2, as the work gear completes one revolution. The result of this is that the indicator 42 will be automatically moved to a position determined by the minimum diameter or low point on the work gear 18. If at this time the indicator is zeroed the maximum eccentricity will be observed and may be read or may provide a semi-permanent indication on the indicator, as is well understood in the art. While the illustration is of a conventional indicator it will be understood that it will ordinarily be desirable to employ extremely accurate indicating devices such for example as those electrically actuated. These may be of the type referred to as LVDT's which are familiar in this art.

Referring now more particularly to FIGURE 1 in conjunction with FIGURES 3 and 4, there will be described the mechanism for sensing such errors as tooth-to-tooth spacing and nicks on the teeth of the work gear. For this purpose the checking structure indicated generally at 68 is provided. This apparatus is mounted on a bracket 70 secured to one side of the base 10 by screws indicated at 72. The checking structure 68 includes a U-shaped body 74 which is suspended from a horizontal arm 76 of the bracket 70 by flexible reeds 78. The U-shaped body 74 is affixed to intermediate portions of the reeds 78 by rigid clamps 80 so that the U-shaped body 74 is permitted to swing to the right and left as seen in FIGURE 3 due to the flexibility of the upper portions of the reeds 78 intermediate the clamps 80 and the horizontal arm 76.

Rigidly affixed to the lower ends of the flexible reeds 78 are cross bars 82 which support a relatively heavy inertia weight 84 having at one end thereof an indicator actuating extension 86.

The U-shaped body 74 carries a block 88 carrying an adjustable abutment screw 90.

As best seen in FIGURE 3, the rigid arm 14 has an abutment 92 thereon in position to engage the end of the adjustable abutment screw 90. In addition, the lever arm 14 near its end is provided with a post 94 extending through an opening therein which at its upper end carries an indicator support block 96. Slidably in ways provided at the top of the support block 96 is an indicator 98 having a depending ear 100 receiving an end of adjusting screw 102 by means of which the indicator may be moved toward and away from the inertia weight 84. The indicator 98 includes an operator 104 engageable with the actuating extension 86 of the weight 84.

With the structure as above described, its operation in sensing tooth-to-tooth spacing and/or nicks on the teeth of the work gear will be described. In the first place it should be kept in mind that an error in eccentricity will cause movement of the lever arms 14 and 16 back and forth once during a complete rotation of the work gear. However, tooth-to-tooth spacing errors as well as a nick on a single tooth of the work gear will produce abrupt movement of the master gear and the supporting bell crank lever, this movement being insured by the spring 28 which maintains the gears in tight mesh at all times. In order to sense both eccentricity as well as the abrupt errors of the tooth-to-tooth spacing type, the work gear is driven in rotation at a speed which permits the inertia weight to substantially follow the movement of the U-shaped body 74 caused by gear eccentricity, the weight being suspended by the lower portions of the reeds 78 intermediate the bars 82 and the clamps 80.

By way of example, if a nick on a tooth of the work gear passes through the zone of mesh, the lever is rotated abruptly about the axis of pivot post 12 by a small amount and is returned to its initial position by the action of spring 28 as soon as the nick has moved through the zone of mesh. The result of this is that the abutment 92 on the lever arm 14 moves to the left as seen in FIGURE 3 an amount which depends upon the magnitude of the nick. This movement is imparted directly to the U-shaped body 74 and is of course accompanied by corresponding movement of the indicator 98. However, at this time, due to its inertia, the inertia weight 84 lags behind the movement of the U-shaped carrier body 74 and this results in a relative movement between the indicator 98 and the inertia weight 84 such that the extension 86 of the weight depresses the operator 104 of the indicator by an amount dependent upon the magnitude of the nick, tooth-to-tooth error, or the like.

It will of course be apparent that the indicator 42 may include a pointer so that the magnitude of the error may be noted but in the usual case the indicator is of the extremely sensitive type, such as an LVDT, and will be connected by suitable wiring to operate signals or the like which may indicate that the error noted is outside of acceptable limits.

Referring now to FIGURE 5 there is illustrated a second embodiment of the invention in which a master gear 110 is mounted for rotation on a post 112 carried by a lever 114 which in turn is mounted on a stationary pivot post 116. A driving arbor 118 is provided for receiving a series of work gears 120 and for driving these in tight meshed engagement with the master gear 110. A tension spring 122 is provided extending between the lever 114 and a stationary spring anchor 124 operating to maintain the master gear and work gear in tight mesh. The lever arm 114 carries an indicator or sensing device 126 including a movable plunger or actuator 127.

Also rotatably mounted on the pivot post 116 is a second lever or arm 128 which at its outer end is provided with a relatively heavy inertia weight 130. The arm 114 is bifurcated at its outer ends and is provided with centering plungers 132 engageable with abutment screws 134 carried by the weight 130. The plungers 132 are lightly biased by adjustable compression springs 136. In addition, limiting abutment means are provided including the abutments 138 carried on the arm 114 and adjustable abutment screws 140 carried by the weight 130.

The actuating plunger 127 of the sensing device 126 engages the lever 128.

If the work gear 120 is eccentric, the relatively slow motion imparted to the lever arm 112 by rotation of the gear 120 will permit the inertia weight 130 to follow the movement thereof. However, upon abrupt movement of the lever 114 such as occasioned by a tooth-to-tooth spacing error, or a nick, the inertia of the weight 130 will cause it to lag behind and hence provide a relative movement between the weight 130 and the indicator or sensing device 126. Suitable signal means or the like electrically connected to the sensing device 126 may be opposed thereby to indicate that the error noted is outside the range of tolerance permitted.

The initial or rest position of the inertia member relative to the movable gear support may be determined by resilient elements such as the flexible reeds 78 shown in the embodiment of the invention illustrated in FIGURES 1–4, or it may be in the form of opposed compression springs 136 as shown in FIGURE 5. These are merely exemplary of simple biasing means and it will of course be understood that the biasing means may be constituted by a particular mounting of the inertia weight so that the force of gravity thereon biases it to an initial or rest position relative to the movable support. Other variations of course may suggest themselves such for example as gravity biased lever means having an arm engageable with the inertia weight, permanent or electromagnets, or the like.

The drawings and the foregoing specification constitute a description of the improved gear checker in such full, clear, concise and exact terms as to enable any person skilled in the art to practice the invention, the scope of which is indicated by the appended claims.

What I claim as my invention is:

1. Gear checking apparatus comprising a stationary member, a member movable toward and away from said stationary member, means on one of said members for mounting a master gear for rotation, means on the other of said members for mounting a work gear for rotation in mesh with said master gear, means effective to maintain gears on said members in tight mesh, means for driving one of said gears in rotation, an abutment on said movable member, a sensing device slidably mounted on said stationary member adjacent said abutment, a lost motion connection between said movable member and said device, said device having a movable operating element engaged with said movable member, said lost motion connection comprising an elongated member slidable relative to said stationary member and engageable with said movable member and having lost motion abutment means with respect to said device, resilient means urging said elongated member toward said movable member with a force sufficient to shift said device to operating position, an inertia member connected to said movable member for movement therewith and relative thereto, bias means effective on said inertia member to oppose relative movement between said inertia member and said movable member but to provide for limited relative movement therebetween upon abrupt movement of said movable member, and means for sensing relative movement between said members.

2. Gear checking apparatus comprising a stationary member, a member movable toward and away from said stationary member, means on one of said members for mounting a master gear for rotation, means on the other of said members for mounting a work gear for rotation in mesh with said master gear, means effective to maintain gears on said members in tight mesh, means for driving one of said gears in rotation, a sensing device comprising a casing member and an actuator movable relative to said casing member, operating means movable with said movable member during rotation of said gears to operate said actuator to measure gear eccentricity, and slidable means interconnecting two of said members having lost motion connections effective to retain all of said members in position to check eccentricity upon gear rotation during relatively great movement of said movable member during loading of a work gear.

3. Gear checking apparatus as defined in claim 2 in which said slidable means interconnects said movable member and said casing member, the lost motion connection being between said slidable member and said casing member.

References Cited by the Examiner
UNITED STATES PATENTS 1,558,294   10/1925   Sandbo.
2,540,961   2/1951    Osplack _____ 33—179.52

LEONARD FORMAN, *Primary Examiner*.